(12) United States Patent
Dobashi et al.

(10) Patent No.: US 12,079,539 B2
(45) Date of Patent: Sep. 3, 2024

(54) ELECTRIC TOOL

(71) Applicant: Panasonic Intellectual Property Management Co., Ltd., Osaka (JP)

(72) Inventors: Kazuo Dobashi, Osaka (JP); Itaru Murui, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 173 days.

(21) Appl. No.: 17/045,134

(22) PCT Filed: Mar. 20, 2019

(86) PCT No.: PCT/JP2019/011787
§ 371 (c)(1),
(2) Date: Oct. 2, 2020

(87) PCT Pub. No.: WO2019/193979
PCT Pub. Date: Oct. 10, 2019

(65) Prior Publication Data
US 2021/0149626 A1    May 20, 2021

(30) Foreign Application Priority Data

Apr. 4, 2018   (JP) ................. 2018-072513

(51) Int. Cl.
*G10L 17/22*     (2013.01)
*B25F 5/00*      (2006.01)
(Continued)

(52) U.S. Cl.
CPC ............... *G06F 3/167* (2013.01); *B25F 5/00* (2013.01); *G10L 17/22* (2013.01); *G10L 25/51* (2013.01); *G10L 17/04* (2013.01); *G10L 17/06* (2013.01)

(58) Field of Classification Search
CPC ...... G06F 3/167; G06F 3/016; G06F 3/03545; G10L 17/04; G10L 17/06; G10L 17/22; G10L 25/51; B25F 5/00
(Continued)

(56) References Cited

U.S. PATENT DOCUMENTS 11,011,031 B2 *   5/2021   Suzuki ................. B25F 5/02
2008/0240393 A1 * 10/2008  De Wit ................. H04M 1/02
                                                        379/204.01
(Continued)

FOREIGN PATENT DOCUMENTS

DE    102012200678 A1    7/2013
DE    102015206015 A1   10/2016
(Continued)

OTHER PUBLICATIONS

International Search Report issued in corresponding International Patent Application No. PCT/JP2019/011787, dated May 14, 2019, with English translation.
(Continued)

*Primary Examiner* — Richemond Dorvil
*Assistant Examiner* — Rodrigo A Chavez
(74) *Attorney, Agent, or Firm* — Rimon P.C.

(57) ABSTRACT

A control unit is adapted to perform a process related to an electric power tool, based on sound input to a microphone. The control unit performs a process related to the electric power tool, based on a result of subjecting input sound to a sound recognition process or a result of subjecting the sound to sound analysis. When a user operation switch is in an on state, the control unit does not perform a sound recognition process, and, when the user operation switch is in an off state, the control unit performs a sound recognition process. Further, when the electric power tool is not in a state of being gripped by the user, the control unit does not perform a
(Continued)

sound recognition process, and, when the electric power tool is in a state of being gripped by the user, the control unit performs a sound recognition process.

9 Claims, 3 Drawing Sheets

(51) Int. Cl.
    *G06F 3/16*     (2006.01)
    *G10L 17/04*    (2013.01)
    *G10L 17/06*    (2013.01)
    *G10L 25/51*    (2013.01)

(58) Field of Classification Search
    USPC .......................................................... 704/246
    See application file for complete search history.

(56) References Cited

U.S. PATENT DOCUMENTS

| | | | | |
|---|---|---|---|---|
| 2014/0316777 A1* | 10/2014 | Cha | ........................ | G06F 3/167 704/231 |
| 2015/0144365 A1* | 5/2015 | Hirabayashi | ........ | B25B 23/1405 173/2 |
| 2015/0207924 A1* | 7/2015 | Kim | .................. | H04M 1/72403 455/414.1 |
| 2015/0279370 A1* | 10/2015 | Koetz | ..................... | G10L 15/00 366/241 |
| 2017/0129091 A1* | 5/2017 | Schiegel | ................ | B25D 16/00 |
| 2018/0257539 A1* | 9/2018 | Nabe | ..................... | B60Q 1/0082 |
| 2019/0182371 A1* | 6/2019 | Ashall | ............... | H04M 1/72469 |
| 2020/0227040 A1* | 7/2020 | Duncan | .................... | G06F 3/167 |
| 2021/0149626 A1* | 5/2021 | Dobashi | .................. | G10L 25/51 |

FOREIGN PATENT DOCUMENTS

| | | |
|---|---|---|
| DE | 102015212028 A1 | 12/2016 |
| JP | 2009-220213 A | 10/2009 |
| JP | 2012-115170 A | 6/2012 |
| JP | 2013-188858 A | 9/2013 |
| JP | 2016-010848 A | 1/2016 |
| JP | 2016-120577 A | 7/2016 |
| JP | 2017-056532 A | 3/2017 |
| JP | 2017-127916 A | 7/2017 |
| JP | 2017-205824 A | 11/2017 |

OTHER PUBLICATIONS

Extended European Search Report issued in corresponding European Patent Application No. 19781003, dated Apr. 12, 2021.

* cited by examiner

ELECTRIC TOOL

CROSS-REFERENCE OF RELATED APPLICATIONS

This application is the U.S. National Phase under 35 U.S.C. § 371 of International Patent Application No. PCT/JP2019/011787, filed on Mar. 20, 2019, which in turn claims the benefit of Japanese Application No. 2018-072513, filed Apr. 4, 2018, the entire disclosures of which Applications are incorporated by reference herein.

TECHNICAL FIELD

The present invention relates to electric power tools.

BACKGROUND ART

Patent literature 1 discloses an electric power tool system including an electric power tool, and a user operation plate that can be attached to or detached from the electric power tool. In the electric power tool system of patent literature 1, the user attaches a user operation plate suited to the work content to the electric power tool and drives a mode switch of the user operation plate to a desired mode. A communication unit of the electric power tool receives mode information that determines driving control of a motor from the user operation plate and outputs the mode information to a microcomputer. The microcomputer subjects the motor to driving control based on the input mode information.
[Patent Literature 1] JP2016-120577

SUMMARY OF INVENTION

Technical Problem

According to patent literature 1, the user has to attach the user operation plate to the electric power tool and manipulate the mode switch to change the driving control mode of the motor, and the process requires a certain effort. In the case a need arises to change the driving control mode while the user is working at a high place, for example, it is not preferred to have the user perform a burdensome user operation. Therefore, realization of a scheme that allows the user to set the driving control mode easily is called for. In recent years, there has been mounting interest in traceability of work, and realization of a scheme for efficiently recording results of work in which the electric power tool is used. While there are also other requirements for electric power tools, the inventors have focused on an approach to improve an information input interface as a means to address various requirements.

A purpose of the present disclosure is to provide a technology related to an information input interface that is excellent in usability.

Solution to Problem

An electric power tool according to an embodiment of the present disclosure includes: a user operation switch adapted to be manipulated by a user; an output shaft on which a front-end tool is adapted to be mounted; a driving unit that drives the output shaft; and a control unit that controls an operation of the driving unit in accordance with manipulation of the user operation switch. The control unit is adapted to perform a process related to the electric power tool, based on sound input to a microphone.

DESCRIPTION OF EMBODIMENTS

Figure 1:
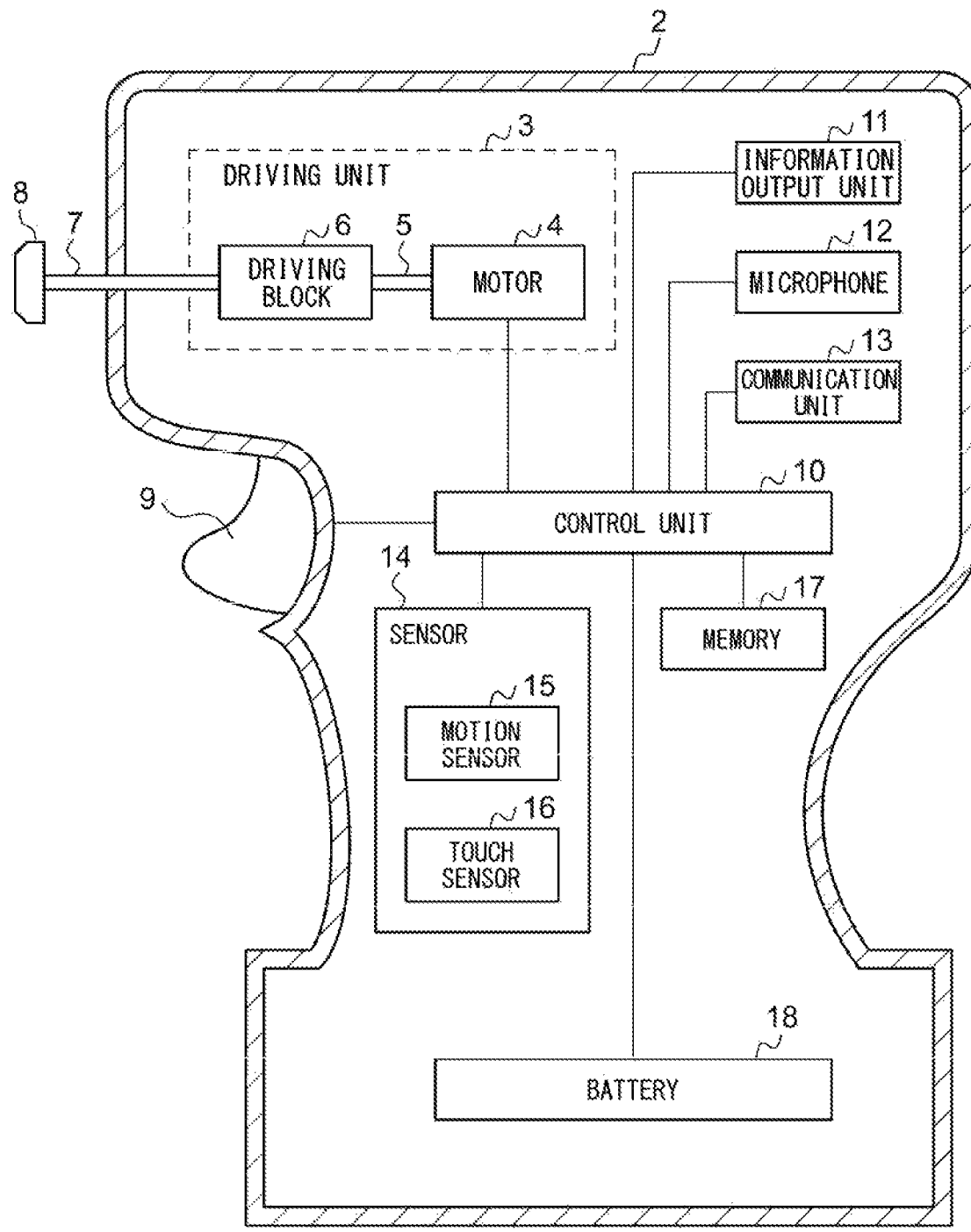
FIG. 1 shows an outline of a portable electric power tool according to the embodiment.

FIG. 1 shows an outline of a portable electric power tool according to the embodiment of the present disclosure. The electric power tool 1 includes a housing 2. Inside the housing 2 are provided a driving unit 3, control unit 10, an information output unit 11, a microphone 12, a communication unit 13, a sensor 14, a memory 17, and a battery 18. The battery 18 is provided toward the lower end of the housing 2 and supplies electric power to the constituting elements in the electric power tool 1. The lower end of the housing 2 may be formed as a battery pack separate from the tool main body and may be detachable from the tool main body.

The information output unit 11 is an output interface that outputs information to the user and may include a speaker for outputting information in the form of sound and/or a display that outputs information on a screen. The microphone 12 is an input interface that receives a sound signal generated by collecting ambient sound. Some features of the information output unit 11 and the microphone 12 may be exposed outside the housing 2. The communication unit 13 is a module for wireless communication with an external device.

The sensor 14 includes a motion sensor 15 and a touch sensor 16. The motion sensor 15 includes a three-axis angular velocity sensor and a three-axis acceleration sensor, and the sensor value of the motion sensor 15 is used to detect the orientation and motion of the electric power tool 1. In the case the electric power tool 1 is an impact rotary tool, the sensor value of the motion sensor 15 may be used to detect a strike by the impact mechanism. The touch sensor 16 is a resistive touch sensor or a capacitance type sensor and senses the contact of the user. The touch sensor 16 may be provided in the grip of the housing 2, and the sensor value of the touch sensor 16 may be used to sense whether user is gripping the electric power tool 1. Further, the touch sensor 16 may be provided in the upper part of the housing 2, and the sensor value of the touch sensor 16 may be used to detect an instruction by the user.

The driving unit 3 includes a motor 4 as a driving source and a driving block 6 coupled to a motor shaft 5 of the motor 4 and drives an output shaft 7. A chuck mechanism 8 is coupled to the output shaft 7. A front-end tool such as a driver and a drill is removably attached to the chuck mechanism 8. A driving block 6 includes a transmission mechanism for transmitting a rotational output of the motor 4 to the front-end tool. More specifically, the driving block 6 may include a power transmission mechanism for transmitting the rotational torque of the motor shaft 5 to the output shaft 7. The power transmission mechanism may include a planetary gear deceleration mechanism in mesh with a pinion gear attached to the motor shaft 5. In the case the electric power tool 1 is a rotary impact tool, the power transmission mechanism includes an impact mechanism for generating an intermittent rotary impact force in the output shaft 7.

The control unit 10 is implemented by a microcomputer, etc. carried on a control board. The control unit 10 has the function for integrated control of the electric power tool 1 and performs various processes related to the electric power tool 1. The frontward grip portion of the housing 2 is provided with a user operation switch 9 that can be manipulated by the user. The user operation switch 9 may be a trigger switch that can be pulled for manipulation. The control unit 10 controls on and off of the motor 4 according to the manipulation of the user operation switch 9 and controls the voltage applied to the motor 4 to adjust the motor revolution in accordance with a level of manipulation of the user operation switch 9.

In the electric power tool 1 according to the embodiment, the microphone 12 functions as an information input interface for inputting a sound signal to the control unit 10, and the control unit 10 makes processes related to the electric power tool 1 executable, based on the sound input to the microphone 12. With the microphone 12 mounted in the electric power tool 1, the user can control the operation of the electric power tool 1 by uttering user operation information instead of manipulating a user operation button.

Before work, the user sets a parameter value for controlling the operation of the motor 4 in the electric power tool 1 for the purpose of torque management. As the user utters a parameter value that should be set for torque management, the control unit 10 can register the parameter value in the memory 17 based on the user sound input to the microphone 12.

Operation control of the motor 4 for torque management has been practiced in a variety of methods depending on the type of the electric power tool 1. For accurate torque management in rotary impact tools, for example, a tightening torque value is estimated, the seating of a screw member is determined by referring to the estimated tightening torque value, and shut-off control of automatically stopping the rotation of the motor when the number of impacts after the seating has reached a preset impact count is performed. In the case the electric power tool 1 is a rotary impact tool, the user sets, before starting to work, "a seating determination level" and "a preset number of torque steps" in the electric power tool 1 as parameters for torque management.

The seating determination level is a parameter that defines a torque value for determination of the seating of a screw member. For example, nine options of selection (L1-L9) are made available for the user. In the presence of a high load encountered during the work due to the attachment of paint or the like on a target of work, it is preferred to set a high seating determination level. In the case of a low load encountered during the work, it is preferred to set a low seating determination level.

The preset number of torque steps is a parameter that defines the number of impacts after the seating for stopping the motor 4 automatically (shut-off impact count). For example, one of 100 selection options (N00-N99) is set by the user. Each preset number of torque steps is associated with the number of shut-off impacts that should occur after the seating. For example, N00 may be associated with 10 shut-off impacts, N01 with 12, N02 with 14, and N03 with 16.

The parameter values of the seating determination level and the preset number of torque steps are stored in the master table in the memory 17. The user sets the parameter values in the electric power tool 1 by uttering "a seating determination level" and "a preset number of torque steps" for obtaining a target torque value before starting to work. If the target of work is changed during the work, the user sets the parameter values in the electric power tool 1 by uttering "a seating determination level" and "a preset number of torque steps" for obtaining a target torque value adapted to the changed target of work. The parameter values thus set are stored in the memory 17 and are used for driving control of the motor 4 by the control unit 10.

Figure 2:
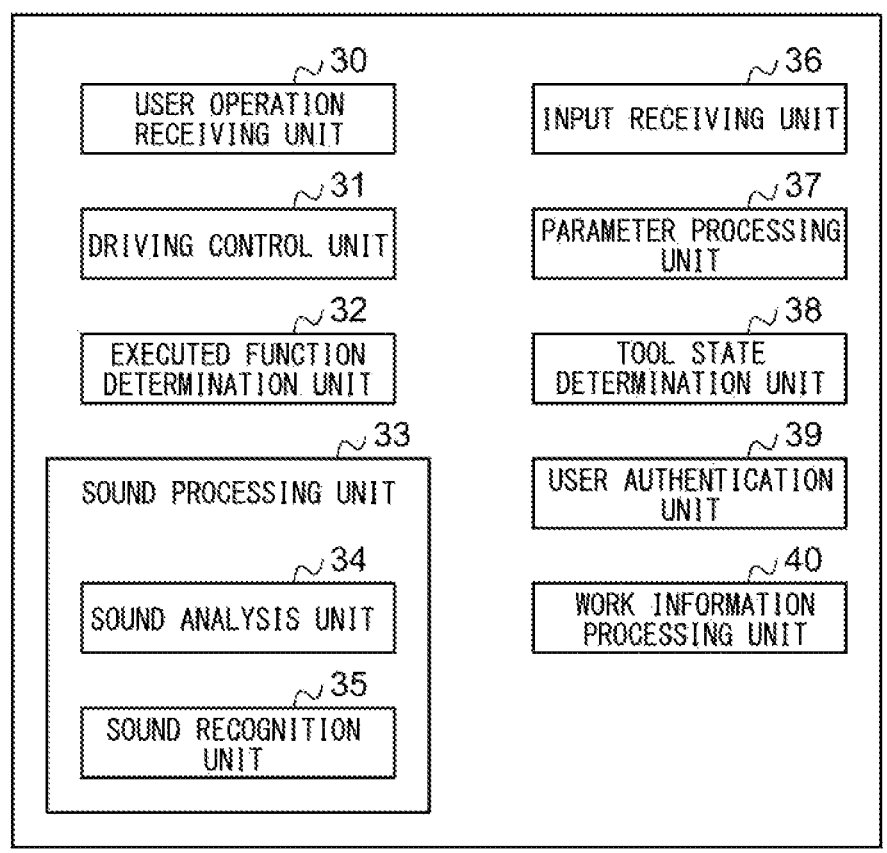
FIG. 2 shows functional blocks of the control unit.

FIG. 2 shows functional blocks of the control unit 10. The control unit 10 includes a user operation receiving unit 30, a driving control unit 31, an executed function determination unit 32, a sound processing unit 33, an input receiving unit 36, a parameter processing unit 37, a tool state determination unit 38, a user authentication unit 39, and a work information processing unit 40, to perform various processes related to the electric power tool 1. The sound processing unit 33 has the function of processing sound input to the microphone 12 and includes a sound analysis unit 34 for subjecting input sound to frequency analysis and a sound recognition unit 35 for subjecting sound uttered by the user to sound recognition.

The elements depicted in FIG. 2 as functional blocks for performing various processes are implemented in hardware such as circuit blocks, memories, and other LSIs and in software such as a program loaded into a memory. Therefore, it will be understood by those skilled in the art that the functional blocks may be implemented in a variety of manners by hardware only, software only, or by a combination of hardware and software.

The user operation receiving unit 30 receives the user operation in the user operation switch 9 and provides the user operation to the driving control unit 31. The driving control unit 31 supplies electric power to the motor 4 in accordance with the on operation of the user operation switch 9 and controls the operation of the driving unit 3. As described above, the user sets a parameter value for torque management in the electric power tool 1 according to the embodiment before starting to work. The driving control unit 31 controls the rotation of the motor 4 in accordance with the parameter value stored in the memory 17.

When the power of the electric power tool 1 is on, the microphone 12 receives various sound such as the sound uttered by the user and the operating sound generated by the electric power tool 1 during the work. The control unit 10 makes various processes related to the electric power tool 1 executable, based on the sound input to the microphone 12. In the embodiment, the sound recognition unit 35 has the function of subjecting the user's utterance to a sound recognition process. The functions in the control unit 10 make processes related to the electric power tool 1 executable, based on the result of subjecting the sound input to the microphone 12 to a sound recognition process by the sound recognition unit 35. In other words, the user can cause the control unit 10 to perform various processes by uttering sound to the microphone 12.

<Sound Recognition Process>

The sound recognition unit 35 has an important role in implementing sound input by the user but consumes a larger electric power as compared to the other constituting elements. Since the electric power tool 1 is driven by the battery 18, wasteful power consumption is not preferable. Further, when the sound recognition function of the sound recognition unit 35 is always turned on (activated), the sound recognition unit 35 may recognize unrelated sound, and the electric power tool 1 may operate falsely based on the recognized sound. In this regard, the executed function determination unit 32 monitors the state of the electric power tool 1 and determines whether or not to execute the sound recognition function such that the sound recognition function of the sound recognition unit 35 is turned on only when necessary.

Figure 3:
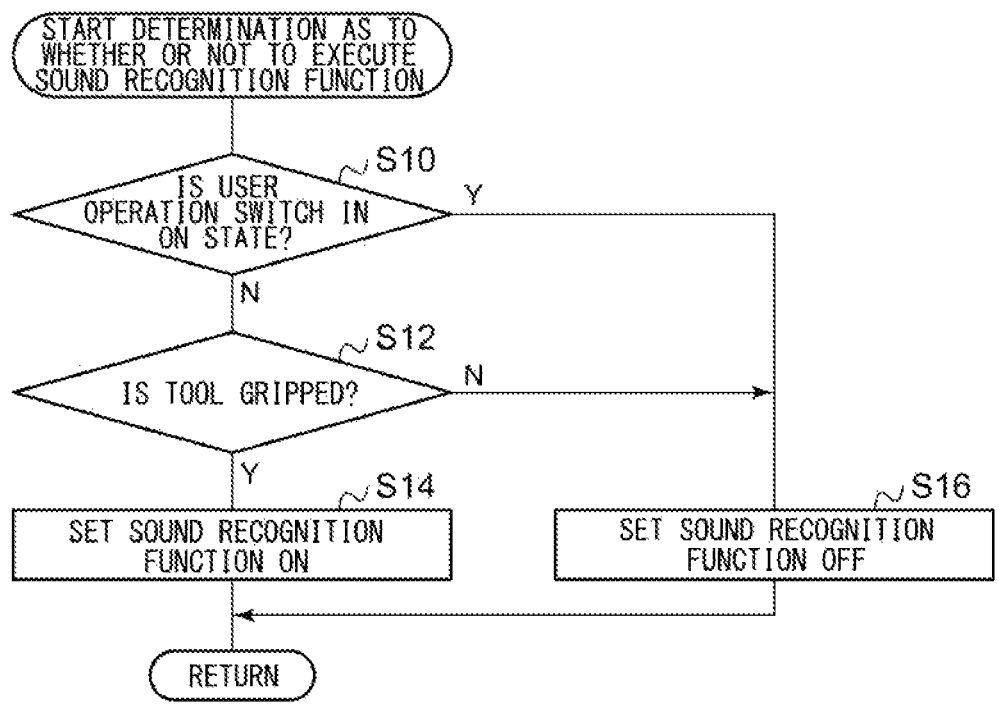
FIG. 3 is a flowchart for determination as to whether or not to execute the sound recognition function.

FIG. 3 is a flowchart for determination as to whether or not to execute the sound recognition function. The executed function determination unit 32 determines whether the user operation switch 9 is in the on state (S10). The on state of the user operation switch 9 is a state in which the user is manipulating the user operation switch 9. The off state of the user operation switch 9 is a state in which the user is not manipulating the user operation switch 9.

When the user operation switch 9 is in the on state (Y in S10), the executed function determination unit 32 sets the sound recognition function off (S16). When the sound recognition function is set to be off, the sound recognition unit 35 does not perform a sound recognition process. When the user operation switch 9 is in the on state, the operating sound of the driving unit 3 is generated from the electric power tool 1. If the sound recognition unit 35 performs a sound recognition process in this situation, however, the likelihood that the user's utterance is recognized falsefully is high. To avoid wasteful power consumption, therefore, the sound recognition unit 35 is prohibited from performing a sound recognition process when the user operation switch 9 is in the on state.

When the user operation switch 9 is in the off state (N in S10), the executed function determination unit 32 determines whether the electric power tool 1 is gripped by the user (S12). The executed function determination unit 32 determines whether the electric power tool 1 is gripped by the user by referring to the sensor value of the motion sensor 15. In the case the touch sensor 16 is provided in the grip portion, the executed function determination unit 32 may determine whether the electric power tool 1 is gripped by the user by referring to the sensor value of the touch sensor 16.

When the electric power tool 1 is in a state of not being gripped by the user (N in S12), the executed function determination unit 32 sets the sound recognition function off (S16). The electric power tool 1 according to the embodiment is portable and should be invariably gripped by the user when used. That the electric power tool 1 is not gripped by the user means that the electric power tool 1 is placed on the floor, a desk, etc. with the power being turned on. It is not known whether the electric power tool 1 is scheduled to be used in the future. For this reason, the executed function determination unit 32 is configured to set the sound recognition function off when the electric power tool 1 is not gripped by the user in order to avoid wasteful power consumption. In other words, the sound recognition unit 35 does not perform a sound recognition process when the electric power tool is not gripped by the user.

When the electric power tool 1 is in a state of being gripped by the user (Y in S12), on the other hand, the executed function determination unit 32 sets the sound recognition function on (S14). That the electric power tool 1 is gripped by the user indicates that it is highly likely that the electric power tool 1 is about to be used for work. It is preferred that the sound recognition unit 35 subjects the user's utterance to a sound recognition process and provides the result of the sound recognition process as the sound input for the processing functions of the control unit 10.

FIG. 3 shows the determination steps in S10 and S12, but the executed function determination unit 32 may control the operation of the sound recognition unit 35 by determining whether to execute the sound recognition function merely by performing one of the determination steps. When the executed function determination unit 32 uses only the determination step of S10, the sound recognition unit 35 does not perform a sound recognition process when the user operation switch 9 is in the on state and performs a sound recognition process when the user operation switch 9 is in the off state. For example, the executed function determination unit 32 may set the sound recognition function on only during a predetermined period of time (e.g., 30 seconds) after the user operation switch 9 is turned off. When the executed function determination unit 32 uses only the determination step of S12, the sound recognition unit 35 does not perform a sound recognition process when the electric power tool 1 is in a state of not being gripped by the user and performs a sound recognition process when the electric power tool 1 is in state of being gripped by the user. In any case, it is preferred that the executed function determination unit 32 restrict the opportunities for unnecessary sound recognition processes by the sound recognition unit 35 to suppress wasteful power consumption.

The executed function determination unit 32 may determine whether to execute the sound recognition function by employing an additional determination step in addition to the determination step of S12. For example, the executed function determination unit 32 may set the sound recognition function on when the electric power tool 1 is gripped by the user and when the electric power tool 1 is at a predetermined orientation or is caused to make a predetermined motion. The predetermined orientation may be an orientation in which the front-end tool faces upward, and the predetermined motion may be a motion that draws a circle in the air with the electric power tool 1. The predetermined orientation or motion is consciously induced by the user to set the sound recognition function on. The sound recognition unit 35 may be configured to perform a sound recognition process when the electric power tool 1 is in a predetermined orientation or is caused to make a predetermined motion.

The executed function determination unit 32 may set the sound recognition function on only during a predetermined period of time (e.g., 30 seconds) after the electric power tool 1 is in a predetermined orientation or is caused to make a predetermined motion. The scheme can significantly restrict the time for which the sound recognition function of the sound recognition unit 35 is on and contributes to suppression of power consumption.

As discussed above, the executed function determination unit 32 manages on and off of the sound recognition function by the sound recognition unit 35. An example will be discussed below in which the processing functions of the control unit 10 perform processes related to the electric power tool 1, based on the result of subjecting the sound input to the microphone 12 to a sound recognition process by the sound recognition unit 35.

As shown in FIG. 2, the control unit 10 has various processing functions. Therefore, the user calls a processing function by uttering information identifying the processing function and then utters a content for the processing function to process. When the user sets a parameter value, the user utters a start word for starting the parameter processing unit 37 by voicing "Set a parameter". Further, when the user registers a history of work information, the user utters a start word for starting the work information processing unit 40 by voicing "Register work information". In the embodiment, the user utters information identifying a processing function of the control unit 10 to start the associated processing function and then utters the content of the process.

The sound recognition unit 35 of the control unit 10 converts the utterance of the user into text data by performing the sound recognition process. The input receiving unit 36 receives the text data as the sound input by the user. The input receiving unit 36 provides the executed function determination unit 32 with the text data for the start word received before the processing function is started. The executed function determination unit 32 identifies the processing function to start, by referring to the text data for the start word. If the text data reads "Set a parameter", for example, the executed function determination unit 32 starts the parameter processing unit 37. If the text data reads "Register work information", the executed function determination unit 32 starts the work information processing unit 40. If the text data reads "Perform user authentication", the executed function determination unit 32 starts the user authentication unit 39. The correspondence between the start word and the processing function started is stored in the memory 17. The executed function determination unit 32 refers to the correspondence stored in the memory 17 and identifies the processing function executed.

After the processing function corresponding to the start word is started, the input receiving unit 36, when receiving the text data from the sound recognition unit 35, provides the text data to the started processing function. This causes the processing function to receive the sound input by the user and execute the corresponding process. Hereinafter, an example will be described in which the processing function processes the sound input of the user while the processing function is started by the start word.

<Parameter Value Setting Process>

The user sets, in the electric power tool 1, a parameter value for controlling the operation of the driving unit 3 for the purpose of torque management. In the case the electric power tool 1 is a rotary impact tool, the user sets "a seating determination level" and "a preset number of torque steps". When the user utters a parameter value, the input receiving unit 36 receives text data for the parameter value resulting from the sound recognition process by the sound recognition unit 35. The input receiving unit 36 provides the text data to the parameter processing unit 37.

The parameter processing unit 37 overwrites and updates the parameter value stored in the memory 17 with the parameter value provided from the input receiving unit 36. This causes the parameter processing unit 37 to set the parameter value provided from the input receiving unit 36 as the parameter value for use in driving control of the motor 4 by the driving control unit 31.

As described above, the parameter processing unit 37 sets the parameter value for torque management, based on the result of a sound recognition process by the sound recognition unit 35. Since the parameter value is reflected in driving control of the motor 4, it may not be appropriate to update the parameter value, depending on the state of the electric power tool 1. To address this, the executed function determination unit 32 monitors the state of the electric power tool 1 and determines whether or not to execute the parameter setting function by the parameter processing unit 37.

Figure 4:
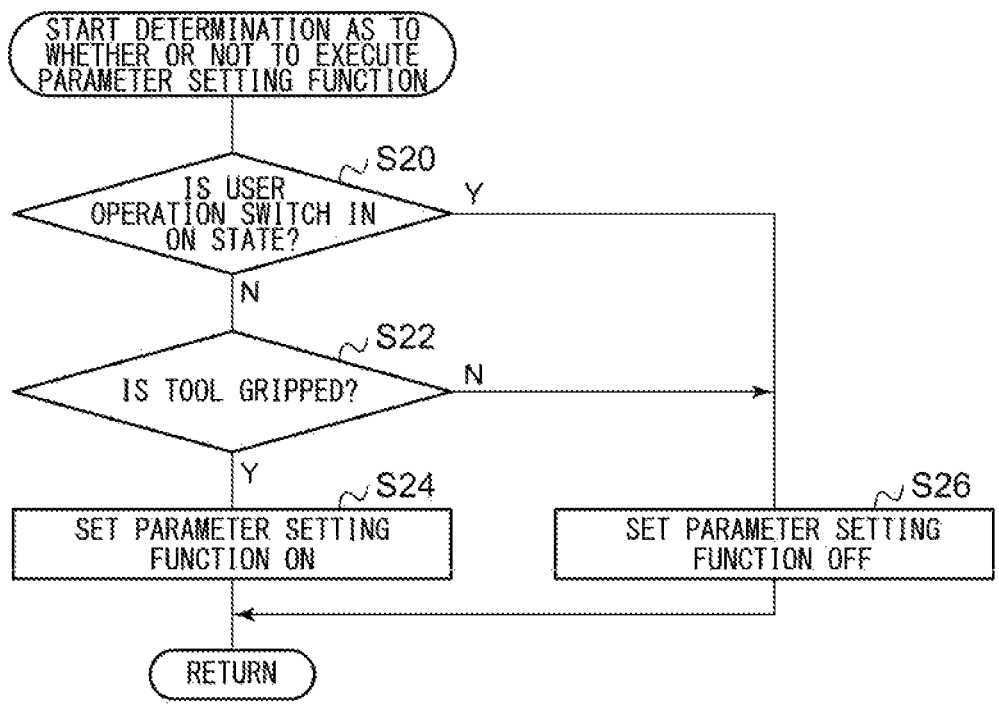
FIG. 4 is a flowchart for determination as to whether or not to execute the parameter setting function.

FIG. 4 is a flowchart for determination as to whether or not to execute the function of setting a parameter value. FIG. 3 is a flowchart for determination as to whether or not to execute the sound recognition function. The executed function determination unit 32 makes the determination shown in FIG. 3 as to whether or not to execute the sound recognition function and the determination shown in FIG. 4 as to whether or not to execute the parameter setting function as separate determination processes. In the embodiment, the executed function determination unit 32 makes both the determination as to whether or not to execute the sound recognition function and the determination as to whether or not to execute the parameter setting function. In an alternative example, only one of the determinations may be made.

The executed function determination unit 32 determines whether the user operation switch 9 is in the on state (S20). When the user operation switch 9 is in the on state (Y in S20), the executed function determination unit 32 sets the parameter setting function off (S26). When the parameter setting function is set to be off, the parameter processing unit 37 does not perform a parameter value setting process. When the user operation switch 9 is in the on state, the driving control unit 31 is subjecting the motor 4 driving control based on the parameter value registered in the memory 17. It is therefore not preferred to change the parameter value in use while the motor 4 is being driven. Thus, the parameter processing unit 37 is prohibited from performing a parameter value setting process when the user operation switch 9 is in the on state.

When the user operation switch 9 is in the off state (N in S20), the executed function determination unit 32 determines whether the electric power tool 1 is gripped by the user (S22). The executed function determination unit 32 may determine whether the electric power tool 1 is gripped by the user by referring to the sensor value of the motion sensor 15 or the sensor value of the touch sensor 16.

When the electric power tool 1 is in a state of not being gripped by the user (N in S22), the executed function determination unit 32 sets the parameter setting function off (S26). In the embodiment, the user's grip of the electric power tool 1 is defined as a condition to change a parameter value in the electric power tool 1 by uttered sound. Therefore, the parameter processing unit 37 does not perform a parameter value setting process unless the electric power tool 1 is gripped by the user.

When the electric power tool 1 is in a state of being gripped by the user (Y in S22), on the other hand, the executed function determination unit 32 sets the parameter setting function on (S24). That the electric power tool 1 is gripped by the user indicates that it is highly likely that the electric power tool 1 is about to be used for work. Thus, the parameter processing unit 37 registers the parameter value provided from the input receiving unit 36 in the memory 17 and causes it to be used as the parameter value for subsequent motor driving control. When the user operation switch 9 is turned on when the parameter processing unit 37 registers the parameter value in the memory 17, the driving unit 3 disregards the on operation of the user operation switch 9 and prevents the driving unit 3 from operating.

FIG. 4 shows the determination steps in S20 and S22, but the executed function determination unit 32 may make a determination as to whether not to execute the parameter setting function and control the operation of the parameter processing unit 37 by performing only one of the determination steps. When the executed function determination unit 32 uses only the determination step of S20, the parameter processing unit 37 does not perform a parameter value setting process when the user operation switch 9 is in the on state and performs a parameter value setting process when the user operation switch 9 is in the off state. Further, when the executed function determination unit 32 uses only the determination step of S22, the parameter processing unit 37 does not perform a parameter value setting process when the electric power tool 1 is in a state of not gripped by the user and performs a parameter value setting process when the electric power tool 1 is in a state of being gripped by the user. Thus, the executed function determination unit 32 determines whether or not to execute a parameter setting function by the parameter processing unit 37 so that the parameter setting function is performed at a proper point of time.

The user attempting to set a parameter value utters the parameter value, and the parameter processing unit 37 sets the parameter value based on the parameter value provided from the input receiving unit 36. It is assumed here that the user utters one of the nine selection options (L1-L9) of the seating determination level and utters one of the 100 selection options (N00-N99) of the preset number of torque steps. When the user utters "L5N50", the parameter processing unit 37 sets the parameter values in the memory 17 based on the sound input of "L5N50".

The user attempting to set a parameter value may utter information related to work, and the parameter processing unit 37 may set the parameter value based on the information related to work provided from the input receiving unit 36. In the case the memory 17 stores information on a place of work in association with a parameter value suited to the work content, for example, the user utters information on a place of work. In this case, the parameter processing unit 37 can retrieve the parameter value associated with the place of work from the memory 17 and set the retrieved parameter value. Further, in the case the memory 17 stores information such as a thread diameter and a thread length for identifying a target of work in association with a parameter value, the user utters information identifying a target of work. In this case, the parameter processing unit 37 can retrieve the parameter value associated with the target of work from the memory 17 and set the retrieved parameter value. Thus, when the memory 17 registers a parameter value in association with information related to work, the user can set the parameter value suited to the work content in the electric power tool 1 by uttering information related to work.

It is preferred that the parameter processing unit 37 does not set a parameter value immediately when it is provided by the input receiving unit 36 with text data resulting from a voice recognition process. Instead, it is preferred to notify the user of a change in the parameter value via the information output unit 11. The information output unit 11 may output information related to the updated parameter value in the form of sound output from the speaker or provide an on-screen output on a display. When notified of information related to the parameter value, the user utters an agreement in the case the user agrees to the parameter value. The parameter processing unit 37 retrieves text data indicating the user's agreement from the input receiving unit 36. After retrieving the text data, the parameter processing unit 37 changes the parameter value. The indication of the user's agreement may be received by the input receiving unit 36 through a predetermined touch operation in the touch sensor 16.

Thus, it is preferred that the parameter processing unit 37 notify the user that a parameter value is about to be set via the information output unit 11 and set the parameter value after gaining the user's consent. This allows the user to recognize that the parameter value is about to be changed before the parameter value is changed. If the communicated parameter value differs from the uttered parameter value due to misrecognition by the sound recognition unit 35, the user need only utter a correct parameter value again.

<Process Related to Storage of Work Information>

To realize traceability of work, the user utters information related to work and causes the memory 17 to record the information related to work. When the user utters a place of work as the information related to work, the work information processing unit 40 is provided with text data for the place of work from the input receiving unit 36 and stores the information indicating the place of work in the memory 17.

The work information processing unit 40 retrieves information indicating a result of work from the sensor 14. In this example, the sensor 14 includes a torque measurement sensor, and the work information processing unit 40 retrieves, as the information indicating the result of work, a tightening torque value of the target of work measured by the torque measurement sensor. The work information processing unit 40 retrieves the tightening torque values of all targets of work from the sensor 14 and stores the values as the information indicating the result of work in the memory 17. In this process, the work information processing unit 40 stores the information indicating the place of work and the information indicating the result of work in association with each other in the memory 17 in order to realize traceability of work. The information can be used to determine whether the work at the place of work has been performed properly.

The work information processing unit 40 may cause the communication unit 13 to transmit the information indicating the place of work and the information indicating the result of work associated with each other to an external server. By aggregating the results of work at the respective places of work in the external server, it is possible to determine whether the work has been performed properly in each place of work.

<Process Related to User Authentication>

In order to prevent illegitimate use, the electric power tool 1 according to the embodiment may include a user authentication function that utilizes the user's utterance. For example, the memory 17 registers a password for authentication. The user utters the password set in the electric power tool 1. The user authentication unit 39 is provided with text data for the uttered password from the input receiving unit 36 and compares the text data with the password registered in the memory 17. If the passwords match, the user authentication unit 39 authenticates the uttering user as the legitimate user and enables the user to use the electric power tool 1. If the passwords do not match, on the other hand, it means that the uttering user is not the legitimate user so that the user authentication unit 39 does not permit the user to use the tool.

Described above is the operation of the processing function that uses the result of a sound recognition process by the sound recognition unit 35. A description will be given below of the operation of the processing function that uses the result of sound analysis by the sound analysis unit 34.

The electric power tool 1 can perform user authentication using the result of sound analysis by the sound analysis unit 34. In this case, the memory 17 stores voice print data for the registered user of the electric power tool 1. The sound analysis unit 34 subjects the sound of the uttering user to frequency analysis and determines whether the uttering the user is the registered user by comparing the analyzed data with the voice print data for the registered user stored in the memory 17. The user authentication function of the electric power tool 1 prevents the unauthenticated user from using the electric power tool 1 so that the risk of the electric power tool 1 being stolen is reduced.

<Analysis of Operating Sound>

The electric power tool 1 may include a determination function for analyzing the operating sound of the electric power tool 1 input to the microphone 12 and making its own judgment as to the state of the electric power tool 1. The sound analysis unit 34 subjects the operating sound of the electric power tool 1 to frequency analysis, and the tool state determination unit 38 compares the analyzed frequency characteristic with the reference frequency characteristic of the operating sound of the electric power tool 1. The reference frequency characteristic is a frequency characteristic of the operating sound generated by the electric power tool 1 shipped and is registered in the memory 17. When a frequency component not found in the reference frequency characteristic occurs in the analyzed frequency characteristic, the tool state determination unit 38 identifies an abnormality or wear of the driving unit 3. When an abnormality or the like is determined to occur, it is preferred that the tool state determination unit 38 notify the user via the information output unit 11.

When the user operation switch 9 is in the on state, the tool state determination unit 38 performs a state determination function based on the operating sound. When the user operation switch 9 is in the off state, the tool state determination unit 38 does not perform a state determination function. When an abnormality or the like is determined to occur, the tool state determination unit 38 may cause the communication unit 13 to notify an external server of the occurrence of an abnormality or the like.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

In the embodiment, it has been described that the electric power tool 1 includes the microphone 12 and the sound processing unit 33. In a variation, the microphone 12 may be provided in a further terminal device having a communication function, and the terminal device may transmit a sound signal collected by the microphone 12 to the electric power tool 1. Further, the terminal device may further include the function of the sound processing unit 33 and transmit the result of processing the sound signal collected by the microphone 12 to the electric power tool 1. This allows the control unit 10 in the electric power tool 1 to perform a process related to the electric power tool 1, based on the sound input to the microphone 12 provided in the further terminal device. The terminal device may be a portable terminal device such as a smartphone and a tablet having a microphone and a wireless communication module.

In the embodiment, it is described that, as the user utters a start word to start a processing function, the executed function determination unit 32 starts the associated processing function. In a variation, the sound processing unit 33 may have a natural language processing function, and the natural language processing function may subject the user's utterance to linguistic analysis to identify the processing function to start. In this case, the user may not utter a start word to start a particular processing function. The executed function determination unit 32 starts the processing function in accordance with the content of user's utterance. For example, when the user utters "L5N50", the natural language processing function identifies that the utterance relates to a parameter, and the executed function determination unit 32 may start the parameter processing unit 37.

One embodiment of the present invention is summarized below. An electric power tool (1) according to an embodiment of the present disclosure includes: a user operation switch (9) adapted to be manipulated by a user; an output shaft (7) on which a front-end tool is adapted to be mounted; a driving unit (3) that drives the output shaft (7); and a control unit (10) that controls an operation of the driving unit (3) in accordance with manipulation of the user operation switch (9). The control unit (10) is adapted to perform a process related to the electric power tool (1), based on sound input to a microphone (12).

The control unit (10) may perform a process related to the electric power tool (1), based on a result of subjecting input sound to a sound recognition process.

When the user operation switch (9) is in an on state, the control unit (10) may not perform a sound recognition process, and, when the user operation switch (9) is in an off state, the control unit (10) may perform a sound recognition process. When the electric power tool (1) is not in a state of being gripped by the user, the control unit (10) may not perform a sound recognition process, and, when the electric power tool (1) is in a state of being gripped by the user, the control unit (10) may perform a sound recognition process. When the electric power tool (1) is gripped by the user, and when the electric power tool (1) is at a predetermined orientation or is caused to make a predetermined motion, the control unit (10) may perform a sound recognition process.

The control unit (10) may set a parameter value for controlling the operation of the driving unit (3), based on a result of subjecting input sound to a sound recognition process. The control unit (10) may set a parameter value, based on information related to work.

When the user operation switch (9) is in an on state, the control unit (10) may not set a parameter value, and, when the user operation switch (9) is in an off state, the control unit (10) may set a parameter value. When the electric power tool (1) is not in a state of being gripped by the user, the control unit (10) may not set a parameter value, and, when the electric power tool (1) is in a state of being gripped by the user, the control unit (10) may set a parameter value. The control unit (10) may set a parameter value after notifying the user that a parameter value is about to be set.

The control unit (10) may receive an input of information indicating a place of work and store the information indicating the place of work and information indicating a result of work in association with each other. The control unit (10) may cause the information indicating the place of work and the information indicating a result of work associated with each other to be transmitted to an external device. The control unit (10) may include a determination function of determining a state of the electric power tool (1) by analyzing an operating sound input to a microphone (12). The determination function may be performed when the user operation switch (9) is in an on state. The control unit (10) may include a user authentication function based on sound input to a microphone (12).

REFERENCE SIGNS LIST

1 . . . electric power tool,
3 . . . driving unit,
4 . . . motor,
7 . . . output shaft,
9 . . . user operation switch,
10 . . . control unit,
11 . . . information output unit,
12 . . . microphone,
17 . . . memory,
18 . . . battery,
32 . . . executed function determination unit,
33 . . . sound processing unit,
34 . . . sound analysis unit,
35 . . . sound recognition unit,
36 . . . input receiving unit,
37 . . . parameter processing unit, 38 ... tool state determination unit,
39 ... user authentication unit,
40 ... work information processing unit

INDUSTRIAL APPLICABILITY

The present invention can be used in the field of electric power tools.

The invention claimed is:

1. An electric power tool comprising:
a user operation switch adapted to be manipulated by a user;
an output shaft on which a front-end tool is adapted to be mounted;
a driving unit that drives the output shaft; and
a control unit that controls an operation of the driving unit in accordance with manipulation of the user operation switch, wherein
the control unit is adapted to perform a process related to the electric power tool, based on sound input to a microphone,
the control unit performs a process related to the electric power tool, based on a result of subjecting the input sound to a sound recognition process,
the control unit performs the sound recognition process while the user operation switch is in an off state,
the control unit does not perform the sound recognition process while the user operation switch is in an on state and an operating sound of the driving unit is generated,
when the electric power tool is not in a state of being gripped by the user, the control unit does not perform the sound recognition process, and, when the electric power tool is in a state of being gripped by the user, the control unit performs the sound recognition process,
when the electric power tool is gripped by the user, and when the electric power tool is at a predetermined orientation in which a front-end tool faces a predetermined direction or is caused to make a predetermined motion that follows a predetermined trajectory, the control unit performs the sound recognition process, and
the control unit sets parameter values, including a seating determination level that defines a torque value for determination of seating of a screw member and a preset number of torque steps that defines a number of impacts after the seating for stopping the driving unit automatically, for controlling the operation of the driving unit, based on the result of subjecting the input sound to the sound recognition process.

2. The electric power tool according to claim 1, wherein the control unit sets the parameter value, based on information related to work.

3. The electric power tool according to claim 1, wherein when the user operation switch is in an on state, the control unit does not set the parameter value, and, when the user operation switch is in an off state, the control unit sets the parameter value.

4. The electric power tool according to claim 1, wherein when the electric power tool is not in a state of being gripped by the user, the control unit does not set the parameter value, and, when the electric power tool is in a state of being gripped by the user, the control unit sets the parameter value.

5. The electric power tool according to claim 1, wherein the control unit sets a parameter value after notifying the user that the parameter value is about to be set.

6. The electric power tool according to claim 1, wherein the control unit receives an input of information indicating a place of work and stores the information indicating the place of work and information indicating a result of work in association with each other.

7. The electric power tool according to claim 6, wherein the control unit causes the information indicating the place of work and the information indicating a result of work associated with each other to be transmitted to an external device.

8. The electric power tool according to claim 1, wherein the control unit includes a determination function of determining a state of the electric power tool by analyzing an operating sound input to a microphone, and the determination function is performed when the user operation switch is in an on state.

9. The electric power tool according to claim 1, wherein the control unit includes a user authentication function based on sound input to the microphone.

* * * * *